United States Patent
Couvelaere et al.

(10) Patent No.: US 6,942,159 B2
(45) Date of Patent: Sep. 13, 2005

(54) METHOD FOR EXTENDING BAR CODE PDF 417 CODING CAPACITIES

(75) Inventors: Francis Couvelaere, Montherot (FR); Michel Perfetti, Douar Nevez (FR)

(73) Assignee: GIAT Industries, Versailles (FR)

( * ) Notice: Subject to any disclaimer, the term of this patent is extended or adjusted under 35 U.S.C. 154(b) by 0 days.

(21) Appl. No.: 10/297,387

(22) PCT Filed: Jun. 7, 2001

(86) PCT No.: PCT/FR01/01752

§ 371 (c)(1), (2), (4) Date: Dec. 6, 2002

(87) PCT Pub. No.: WO01/95251

PCT Pub. Date: Dec. 13, 2001

(65) Prior Publication Data

US 2003/0127517 A1 Jul. 10, 2003

(30) Foreign Application Priority Data

Jun. 8, 2000 (FR) .............................. 00 07321

(51) Int. Cl.[7] .............................................. G06K 19/06
(52) U.S. Cl. .............. 235/494; 235/462.01; 235/462.09
(58) Field of Search ............................ 235/494, 462.09, 235/436, 462.01

(56) References Cited

U.S. PATENT DOCUMENTS 5,243,655 A * 9/1993 Wang ........................ 380/51
5,760,382 A * 6/1998 Li et al. ..................... 235/436
6,126,074 A * 10/2000 He et al. ..................... 235/454
6,196,466 B1 * 3/2001 Schuessler .................. 235/494
6,256,398 B1 * 7/2001 Chang ........................ 382/100

FOREIGN PATENT DOCUMENTS

| DE | 33 30 261 A1 | 3/1985 |
| FR | 2 715 750 | 8/1995 |

OTHER PUBLICATIONS

Hee et al. "Implementation of algorithm to decode two–dimensional barcode PDF–417", Signal Processing, 2002 6th Internation Conference on, vol.: 2, Aug. 26–30, 2002, pp. 1791–1794 vol. 2.*

The Association for Automatic Identification and Data Capture Technologies (AIM USA), Jul. 1994, "Uniform Symbology Specification PDF417".

* cited by examiner

Primary Examiner—Diane I. Lee
Assistant Examiner—Seung H Lee
(74) Attorney, Agent, or Firm—Oliff & Berridge, PLC

(57) ABSTRACT

A process for increasing the data encoding capacity of the PDF 417 bar code. After the data is compressed, the data is read by the data acquisition hardware which is linked to the scanning hardware connected to an information system. The data is distributed, using specific algorithms, into a series of symbols that are dynamically linked to carry out a second compression, an element is introduced to control the integrity of the information, and the formatting and reading of the data is controlled directly by the information system.

5 Claims, 1 Drawing Sheet

METHOD FOR EXTENDING BAR CODE PDF 417 CODING CAPACITIES

This is a 371 of Application No. PCT/FR01/01752, filed Jun. 7, 2001, claiming priority to French Application no. 00/07321, filed Jun. 8, 2000.

BACKGROUND OF THE INVENTION

1. Field of Invention

The technical scope of the invention is that of automatic identification processes using bar codes, such as, for example, the code known under the name PDF (Portable Data File) 417 symbology.

2. Description of Related Art

The PDF bar code generated a lot of interest with the increased supply of corresponding scanners. This bar code is known to provide a substantial encoding capacity, which is not the case for other known, widely distributed, bar codes. This encoding capacity is such that this bar code is no longer quantitatively different but qualitatively different from other identification tools. Its identification role does not consist in merely calling for data, but in providing data directly at a very competitive level of reliability and system possession cost with respect to that implemented in different technologies such as chip cards, PCMCIA cards, or radio labels.

However, in the gaps that bi-dimensional symbologies have created, the limit of 1,000 octets offered by the PDF 417 bar codes remains unsurpassed by other previously mentioned supports. For more details, reference may be made to the document published by Association of Identification Manufacturers in UNIFORM SYMBOLOGY SPECIFICATION PDF 417.

How to distribute and retrieve information on several PDF 417 bar codes are known. However, reading must be carried out in the exact order in which the information was encoded in order to obtain a coherent message. Moreover, when the information is of the binary type, a loss has been noted leading to a recognition by the control bar code that causes disturbances. Lastly, there is no way to control the integrity of the information.

SUMMARY OF THE INVENTION

This invention aims to create a new assembly based on PDF 417 bar codes whose encoding capacity no longer presents any mathematical limits but only physical ones, and which allows the use of commercially-available scanners without requiring any modifications.

The invention thus relates to a process for extending the data encoding capacity using bar codes, such as, for example, the PDF 417 bar code. After a first step of compressing the data, the data is read by data acquisition hardware linked to scanning hardware connected to a information system, wherein the data is distributed using algorithms into a series of bar codes that are dynamically linked to carry out a second compression, an element is introduced to control the integrity of the information, and the formatting and reading of the data is controlled directly by the information system.

According to one characteristic of the invention, the data is distributed in packets of 1 KO, or any other suitable volume. According to another characteristic of the invention, the data acquisition and the application on reception systems are integrated into the information system to which the reading hardware is connected.

One advantage of the invention lies in the fact that the volume of data read is not subject to specific reading hardware and to the size of its memory. Another advantage of this invention lies in the absence of constraints linked to the reading order of the PDF bar codes.

These and other features and advantages of this invention are described in, or are apparent from, the following detailed description of various exemplary embodiments of the systems and methods according to this invention.

BRIEF DESCRIPTION OF THE DRAWINGS

Other characteristics, details and advantages of the invention will be more apparent after reading the additional descriptions given hereafter by way of illustration and in relation to the following Figure.

DETAILED DESCRIPTION OF PREFERRED EMBODIMENTS

Figure 1:
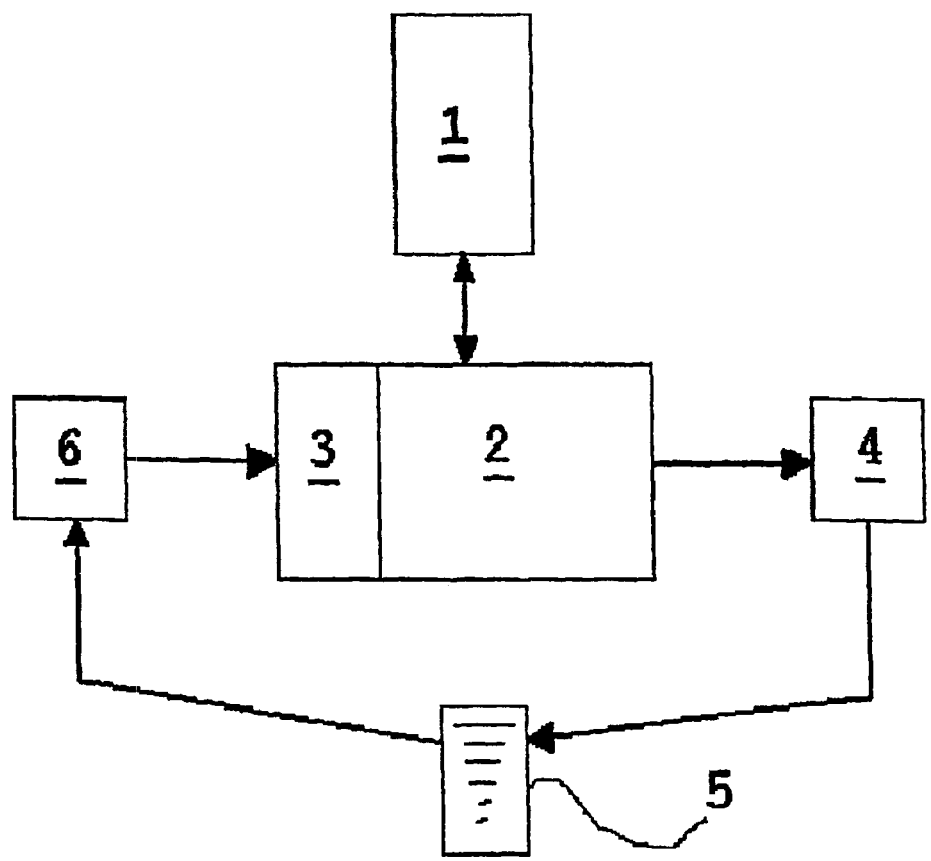
FIG. 1 represents an organization diagram.

As indicated previously, current limits are not imposed by commercially-available scanners while ensuring as many transmissions as readings, by reconstituting the data by the random access memory of the computer and implementing the compression/decompression algorithms using fractals and data encryption algorithms.

It is thus possible to use a standard commercially-available scanner that is not saturated by the quantity of data to be transmitted to a computer integrated into the data acquisition hardware and to the information system. An additional threshold is thus reached, the increase in the encoding and decoding capacity.

To go beyond the limits of the scanner, an unlimited quantity of data is codified and distributed in a series of dynamically linked symbols. Each symbol thus represents a given quantity of the overall codification. The dynamic link helps avoid manipulation errors, such as, for example, inverting the reading order, accidental double reading or non validation in the event of the omission of a symbol.

All the data may, for example, be distributed in a set of four symbols. These four symbols are then read and the information is re-composed by the information system. With this new method it is understood that it is no longer the data acquisition hardware, nor the scanner, for example, that interprets the data, but the information system itself, which amounts to carrying out the interpretation by a power of computation that has nothing in common with the intrinsic capacity of the scanner. The role of this computing power is thus to re-create the structure of the information from each packet that carries the description of the links with the full set of packets.

The process according to the invention allows the use of commercially-available peripherals requiring no particular modification. The process according to the invention overcomes the physical and mathematical limits of the PDF 417 bar code described according to current standards, thereby allowing substantial volumes of information to be processed whilst remaining compatible with common commercially-available printing and reading means. The invention thus affords a considerable advantage. Moreover, the bar codes may be read in any order and certain bar codes may be read twice without any disturbance to the system and without losing the integrity of the information.

For example, a volume of information of around 800 KO may be integrated into four PDF 417 bar codes. Thus, a first data compression is carried out in a classical manner, then the compressed information is reordered into packets of information using polynomial functions in order to achieve a second compression and an integrity parity control command is introduced. In decompression mode, the integration is first read using the information system such as, a microcomputer, for example, then the information is interpreted and the initially compressed information is retrieved. The integration mode is thus recognized in the interpretation and decompression tool. A large quantity of data is thus retrieved for the final user in a transparent and secure manner.

FIG. 1 shows the organization of a system using the process according to the invention. The information system 1 is a dedicated program that encodes and decodes the data and is connected to data acquisition hardware 2, for example, a micro-computer, incorporating a computer 3. The hardware 2 is connected to a printer 4 that prints one or several PDF 417 bar codes 5 resulting from the encoding of the original data. Inversely, the PDF 417 bar code may be read by a scanner 6 that is connected to the data acquisition hardware 2 whose data is decoded by the information system 1 so as to restore the information contained in the PDF 417 bar code into a readable form. If the codes are multiple, no reading order, as previously indicated, is imposed and the system does not deliver any information until all the codes have been read at least once.

What is claimed is:

1. A process for increasing a data encoding capacity of a PDF 417 bar code, comprising:

compressing data into the bar code;

reading the data by a data acquisition hardware linked to a scanning hardware and connected to an information system; and distributing the data, using algorithms, into a series of four symbols that are dynamically linked to carry out a second compression, wherein the compressed information from the second compression is reordered into packets of information using polynomial functions and an element is introduced to control an integrity of the data, and formatting and reading of the data is controlled directly by the information system, and wherein the data can be read in any order.

2. The process according to claim 1, wherein, irrespective of an original volume of the data, the data is distributed in packets of 1 KO.

3. The process according to claim 2, wherein the data acquisition system and an application for processing the data are integrated into the information system to which a reading hardware is connected.

4. The process according to claim 1, wherein the data acquisition system and an application for processing the data are integrated into the information system to which a reading hardware is connected.

5. The process according to claim 1, wherein the scanning hardware is a bar code scanning hardware.

* * * * *